(12) United States Patent
Sander et al.

(10) Patent No.: US 6,478,474 B1
(45) Date of Patent: Nov. 12, 2002

(54) FERRULE FOR AN OPTICAL PLUG-IN CONNECTION

(75) Inventors: Reinhard Sander, Hassloch (DE); Helge Schmidt, Speyer (DE)

(73) Assignee: Tyco Electronics Logistics AG (CH)

( * ) Notice: Subject to any disclaimer, the term of this patent is extended or adjusted under 35 U.S.C. 154(b) by 0 days.

(21) Appl. No.: 09/720,664
(22) PCT Filed: Jul. 1, 1999
(86) PCT No.: PCT/DE99/01959
§ 371 (c)(1), (2), (4) Date: Mar. 2, 2001
(87) PCT Pub. No.: WO00/02070
PCT Pub. Date: Jan. 13, 2000

(30) Foreign Application Priority Data

Jul. 2, 1998 (DE) ........................................ 198 29 630

(51) Int. Cl.[7] ................................................ G02B 6/38
(52) U.S. Cl. ........................................ 385/59; 385/136
(58) Field of Search ........................ 385/59, 60, 71, 385/72, 78, 65, 136, 137

(56) References Cited

U.S. PATENT DOCUMENTS

| | | | |
|---|---|---|---|
| 4,046,454 A | * | 9/1977 | Pugh, III ..................... 385/59 |
| 4,729,624 A | * | 3/1988 | Kakii et al. .................. 385/78 |
| 5,259,050 A | * | 11/1993 | Yamakawa et al. ......... 385/114 |
| 5,315,678 A | * | 5/1994 | Maekawa et al. ............ 385/59 |
| 5,339,376 A | * | 8/1994 | Kakii et al. .................. 385/59 |
| 5,430,819 A | * | 7/1995 | Sizer et al. ................. 385/136 |
| 5,548,675 A | * | 8/1996 | Shigematsu et al. .......... 385/80 |
| 5,568,581 A | * | 10/1996 | Johnson et al. ............. 385/78 |
| 5,620,634 A | | 4/1997 | Shahid |
| 5,815,621 A | * | 9/1998 | Sakai et al. ................ 264/1.1 |
| 6,027,253 A | * | 2/2000 | Ota et al. .................... 385/59 |

FOREIGN PATENT DOCUMENTS

| | | | |
|---|---|---|---|
| EP | 0 530 744 | 3/1993 | |
| EP | 0 859 253 | 8/1998 | |
| FR | 2 268 370 | 11/1975 | |
| JP | 04298704 A | * 3/1991 | ............ G02B/6/36 |
| JP | 7191232 | 7/1995 | |
| WO | 94/28449 | 12/1994 | |
| WO | 97/34179 | 9/1997 | |

OTHER PUBLICATIONS

Copy of International Search Report for corresponding parent application No. PCT/DE99/01959 dated Nov. 26, 1999.

* cited by examiner

Primary Examiner—Brian Sircus
Assistant Examiner—Hae Moon Hyeon
(74) Attorney, Agent, or Firm—Baker & Daniels

(57) ABSTRACT

A ferrule for optical waveguides comprises a plug housing (31) adapted to be mated with another plug housing in a direction of insertion (32). The plug housing (31) has at least one receiving portion (38) for receiving a multiple optical waveguide and is made from thermoplastic plastics material having elongate filler particles (47) admixed thereto. At least in a surrounding region of the receiving portion (38) the filler particles (47) are arranged such that their direction of longitudinal extension runs at least in part transversely to the direction of insertion (32).

13 Claims, 6 Drawing Sheets

FERRULE FOR AN OPTICAL PLUG-IN CONNECTION

FIELD OF THE INVENTION

The invention relates to a ferrule in particular for use in a pluggable connection for at least two multiple optical fibers to be connected to each other and each including at least two optical waveguides.

BACKGROUND

The ferrules of the type concerned are also referred to as multiple optical plugs. These multiple optical plugs are used for connecting multiple optical fibers. Multiple optical fibers comprise a plurality of waveguides that may be connected to individual waveguides of an additional multiple optical fiber. To this end, the individual waveguides are spread apart at the end of each multiple optical fiber and accommodated in a ferrule each. The ferrules are designed such that the individual waveguides of a multiple optical fiber are held in a defined direction and at a defined position. Accordingly, by joining together the face sides of two ferrules, the individual optical waveguides of the multiple optical fibers disposed in the two ferrules may be arranged opposite each other such that the optical waves of one optical waveguide each of the first multiple optical fiber are each fed into an associated optical waveguide of the second multiple optical fiber.

With the known multiple optical plugs, there is the problem that the transmission performance between two apparatus connected by multiple optical fibers is limited. In addition thereto, during transmission of information between two such apparatus, there may arise transmission errors that are due to the pluggable connection between two multiple optical fibers.

SUMMARY OF THE INVENTION

It is thus an object of the invention to make available a ferrule or multiple optical plug of the type concerned, which permits transmission of information with high performance and high reliability.

This object is met by the subject matter of the independent claims. Advantageous further developments are indicated in the respective dependent claims.

According to the invention, the ferrule comprises a plug housing adapted to be inserted into a ferrule container in a direction of insertion and/or to be mated with an additional plug housing, with the plug housing according to the invention having at least two receiving portions for receiving one multiple optical waveguide each.

Due to the design of the ferrule according to the invention with at least two receiving portions for multiple fibers, it is ensured that considerably more individual optical waveguides can be accommodated in the ferrule as compared to known ferrules. The transmission speed of information between apparatus interconnected via multiple optical fibers is thus increased.

The receiving portions provided according to the invention advantageously are arranged beside each other and/or above each other as seen in direction of insertion, with the possibility of arranging the receiving portions in offset manner from each other, in a direction transversely to the direction of insertion, with respect to a line of symmetry of the plug housing. This leads to a particularly high optical waveguide density on a face side of the ferrule according to the invention.

In particular for connecting two plug housings to each other, there may be provided guide bores extending in the direction of insertion, which may be provided with guide pins. These guide bores may also be offset from each other in a direction transversely to the direction of insertion with respect to a line of symmetry of the plug housing, which turns out to be advantageous especially if at least two receiving portions are arranged offset from each other in a direction transversely to the direction of insertion.

The invention is also realized by a ferrule having a plug housing with known function, in which is provided at least one receiving portion for receiving a multiple optical waveguide. For the plug housing according to the invention, there is used thermoplastic plastics material having filler particles admixed therein. Such thermoplastic plastics material is also referred to as matrix with the fillers being provided to reduce the amount of matrix required.

According to the invention, there are provided filler particles having a longitudinal direction of extension, which may extend at least in part transversely to a direction of insertion of the ferrule and at least in part parallel to the direction of insertion, respectively. This results in a ferrule according to the invention with particularly good thermal properties.

Such a ferrule, on at least one side of the plug housing, may have a casting compound entry region, and on a side of the plug housing opposite this casting compound entry region, there may be provided a casting compound exit region. A connecting line between casting compound entry region and casting compound exit region runs parallel to the direction of extension of elongate filler particles provided in a surrounding region of the receiving portion.

Differently therefrom or in addition thereto, the plug housing may have a casting compound entry region on at least one side, with a flow barrier incision in the plug housing being provided between at least one side of the plug housing opposite the casting compound entry region and the casting compound entry region proper. The flow barrier incision is formed as a constriction of the plug housing in a direction transversely to the direction of insertion. A connecting line between the casting compound entry region and the flow barrier incision runs parallel to the direction of extension of elongate filler particles provided in the surroundings of the receiving portion.

The invention is based on the finding that particularly good thermal properties and thus particularly high transmission quality can be achieved if the surroundings of the receiving portion have elongate filler particles provided therein which extend both parallel to each other and preferably transversely to the connecting line of V-shaped grooves in a receiving portion of the ferrule.

The receiving portion may have waveguide grooves extending in the direction of insertion and it may be designed to be closed by a cover. This provides for particularly simple assembly of the ferrule according to the invention. In this respect, it is particularly advantageous if the receiving portion has a dovetail guide means for fixing the cover.

The invention also is realized in a. combination of the features of the independent claims. It is of relevance in this respect that in particular a plug housing with at least two receiving portions for receiving one multiple optical waveguide each can be provided in particularly reliable manner if the plug housing is made of thermoplastic plastics material having elongate filler particles admixed thereto, with the direction of longitudinal extension thereof extending at least in part transversely and in part parallel to the direction of insertion, respectively. Differently therefrom, the plug housing may also be made from thermosetting plastics material, retaining the other features.

The invention also is realized in the form of a method of making a ferrule according to the invention which makes use of a correspondingly designed injection mold.

The multiple optical plugs according to the invention, in particular, are also made from a thermoplastics or thermosetting plastics material highly filled with spherical quartz globes. The multiple optical plug according to the invention, made from thermoplastic plastics material, also works over the entire range of operating temperatures in combination with a multiple optical plug of thermosetting plastics material, also in case of different temperatures of the two mating partners.

One of the fundamental ideas of the present invention is based on the finding that the problems existing in connection with the known ferrules can be solved by way of procedural technology and by selection of suitable thermoplastic plastics materials and suitable fillers.

According to the invention, the thermoplastic plastics material of the ferrule according to the invention comprises at least one partly crystalline thermoplastic material. For example, there are provided in particular Liquid Crystal Polymer (LCP), poly (phenylene sulphide) (PPS), or poly (ether ether keytone) (PEEK).

In addition thereto, there may be provided a filler designed as a reinforcing material, such as e.g. glass, carbon, aramide and/or steel fibers. The fibers of the reinforcing material are designed to have a predetermined diameter/length ratio. For example, there may be provided fibers which, with a diameter of approx. 10 $\mu$m to approx. 20 $\mu$m, have a length of approx. 300 $\mu$m.

In addition thereto, there may also be provided fillers in the form of spherical mineral fillers. Such mineral fillers may have a diameter from approx. 2 $\mu$m to approx. 8 $\mu$mm. These fillers then improve the shrinkage behavior during manufacture of the ferrule according to the invention, which has a particularly favorable effect on the dimensional accuracy in particular in the entire range of operating temperatures. According to the invention, the addition of glass fibers and mineral fillers may take place in a weight ratio of approx. 2:3, aiming at maximum filling of the basic material for making the ferrule according to the invention.

According to the invention, it is possible to influence a specific coefficient of expansion of the ferrule according to the invention also by way of the orientation of the molten plastics material in an injection mold used for making the ferrule. If plastics macro-molecules and fillers, in particular glass fibers formed during solidification of the molten plastics material are aligned, a finding underlying the invention has revealed that a lower coefficient of thermal expansion is present in the direction of the glass fibers and plastics macro-molecules than in a direction perpendicular thereto. Of decisive significance for the operability of the ferrule according to the invention is a region between cylindrical openings for centering pins, which is also referred to as receiving portion for the optical waveguides, since utmost positional accuracy is necessary here. The orientation of the plastics macro-molecules and fillers in this region may also be obtained by the shape and position of a sprue or gating and by the design of a so-called mold void. Film gating at least over the length of a substantial microstructure, such as a receiving portion for optical waveguides, or also over the entire component length, with small cross-sectional area of the sprue or gating and central gating position on a side face, effects an inflow of molten plastics material in the form of a front parallel to a side face, as well as shearing of the molten plastics material and formation of a free jet. By these measures, the molten plastics material is oriented already at the time of injection in line with the optical waveguide fiber arrangement, i.e. especially perpendicularly to the optical waveguides in the receiving portion. To improve the orientation in the relevant region around the receiving portion, the molten plastics material is moved in the direction of injection until shortly before solidification thereof. When using a so-called "lost or broken mold" opposite the sprue portion or by provision of flow deceleration means in the casting tool subsequent to the receiving portion, a sufficient aligning effect may be achieved. Preferably, the casting volume behind the flow deceleration means or the "lost mold" is equal to or greater than the region of the mold constituting the relevant portion of the plastics core.

The ferrule according to the invention makes available a connecting plug of an inexpensive thermoplastic material that distinguishes itself by low material costs and low tool costs. In addition thereto, short cycle times may be achieved, and by suitable choice of the material, lower sensitivity to breakage and thus a higher number of insertion cycles of the ferrule according to the invention can be obtained.

According to the invention, the following exemplary filler and reinforcing materials are feasible: LCP +50n%, PPS +65%, PEEK +50% filler and reinforcing materials.

The ferrule according to the invention, comprising at least two or more receiving portions for receiving one multiple optical waveguide each, with a face area of the ferrule of 16 mm$^2$, may accommodate a total of 12 individual optical waveguides in a grid element spacing of 0.25 mm. Accordingly, when two receiving portions are employed, up to 32 individual optical waveguides can be accommodated. The outer contour, the contact face and optionally the guide members remain the same as compared to the so-called MT standard. Coding of the direction of insertion of the ferrule according to the invention may be realized with the aid of chamfers or by means of different diameters of guide pins.

Differently therefrom, 24-pole MT plugs or MT ferrules may be provided as well.

DESCRIPTION OF THE DRAWINGS

The invention is illustrated in the drawings by way of several embodiments, wherein.

DESCRIPTION OF THE INVENTION

Figure 1:
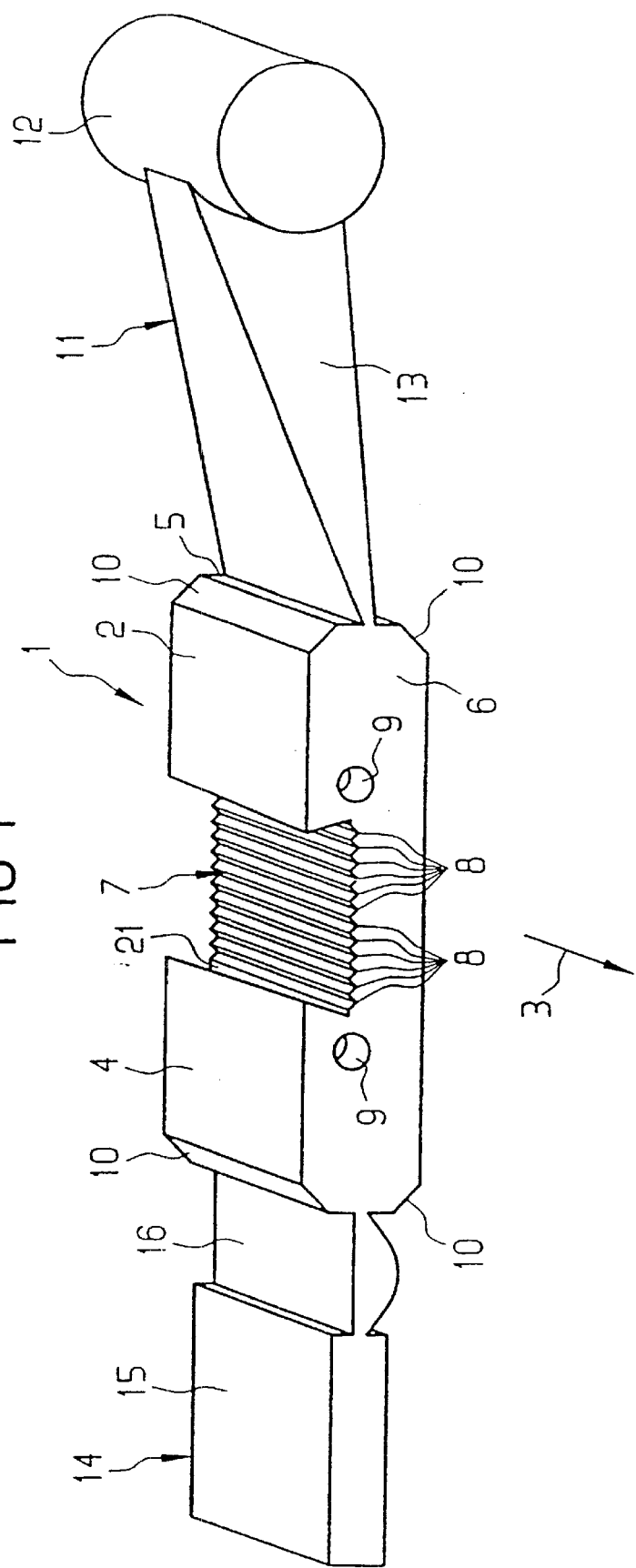
FIG. 1 shows a perspective view of a first ferrule according to the invention in a manufacturing step immediately after unmolding thereof from a mold according to the invention.

FIG. 1 shows a perspective view of a ferrule 1 in a pre-stage of manufacture thereof. This view of the ferrule 1 just shows a plug housing 2 made of thermoplastic plastics material.

The ferrule 1 is intended to be inserted, in a direction of insertion 3, into a plug having a mating face, which is not shown in this view.

The plug housing 2 transversely of the direction of insertion 3 has a substantially rectangular cross-section. Plug housing 2 is confined by a lower elongate face, of which only a front face is visible in this view, an upper elongate face 4 as well as a right-hand side face 5 and a left-hand side face that is not visible in this view either.

Towards the front side, plug housing 2 is confined by a contact face 6, whereas the rear side of plug housing 2 is provided with a terminating face that is not visible in this view.

The top side of plug housing 2, in the upper elongate face 4, is formed with a receiving portion 7 having twelve V-shaped grooves 8 extending parallel to the direction of insertion 3. The V-shaped grooves 8 are intended to receive optical waveguides of a multiple optical fiber not shown in this view. In each V-shaped groove 8, there is inserted exactly one individual optical waveguide. Receiving portion 7 terminates flush with contact face 6. On the other side of plug housing 2, i.e. on the terminating face not visible in this view, the receiving portion 7 also ends flush with the terminating face.

In addition thereto, plug housing 2, in regions to the left and to the right of receiving portion 7, is formed with one guide bore 9 each which may extend through the entire plug housing 2 parallel to the direction of insertion 3 so as to exit on contact face 6 as well as on the terminating face that cannot be seen in this view. Arranged in the guide bores 9 are guide pins, not visible in this view, that project from plug housing 2 beyond contact face 6.

At the outer periphery, in the region of an imaginary connecting edge between the upper elongate face 4, the right-hand side face 5, the left-hand side face and the lower elongate face each, the plug housing 2 according to the invention has guiding and coding chamfers 10 formed as removed portions of plug housing 2 in the region of one of these imaginary connecting edges.

As can be seen in this view particularly well, plug housing 2 is made by a molding method, with the view of FIG. 1 showing the ferrule 1 after removal thereof from an injection mold not illustrated in this view. Accordingly, this view still shows sprue gating and riser portions provided on the plug housing 2. For example, the right-hand side face 5 has a sprue portion 11 constituted by a sprue channel portion 12 and a fan-type gating portion 13 extending between sprue channel portion 12 and the right-hand side face 5.

Extending from the left-hand side face, not visible in this view, is a riser portion 14 constituted by a region of a "lost mold" 15 and an overflow web 16 extending between the region of the "lost mold" 15 and the left-hand side face.

Figure 2:
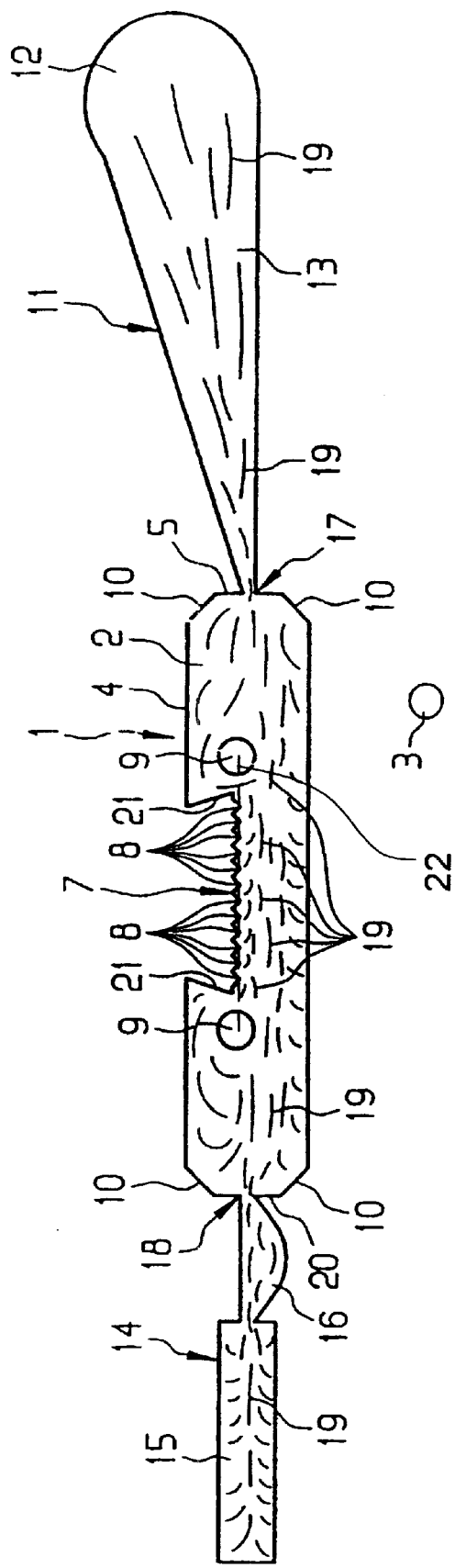
FIG. 2 shows a cross-sectional view of the ferrule of FIG. 1.

FIG. 2 shows the plug housing 2 of FIG. 1 together with sprue portion 11 and riser portion 14 in a cross-sectional view. As is particularly well visible in this illustration, the thermoplastic material for making the plug housing 2 has elongate reinforcing fibers 19 arranged therein, with the main direction of extension thereof being indicated by "lines" and "arcs". The lines in the interior of the outlines of the plug housing 2, the sprue portion 11 and the riser portion 14 also illustrate the local path of the flow of the plastics compound shortly before solidification.

As is clearly visible in FIG. 2, the particular design of an injection mold, not shown in this view, having a molding compound entry region 17 and a molding compound exit region 18, has the effect of aligning filler particles and reinforcing fibers 19 in a direction between molding compound entry region 17 and molding compound exit region 18. In plug housing 2, this provides for alignment of the reinforcing fibers 19 in particular in the region underneath the receiving portion 7 having the V-shaped grooves 8, as well as between the two guide bores 9.

In FIG. 2 only some of the reinforcing fibers 19 bear reference numerals. For the sake of clarity, reference numerals are omitted for the majority of the reinforcing fibers 19 shown in FIG. 2.

Manufacture and finishing of a ferrule 1 according to the invention proceed as outlined hereinafter.

In a first manufacturing step, plug housing 2 is made using an injection molding technique not illustrated in this view. For this purpose, there is provided an injection mold having openings in the area of the molding compound entry region 17 and the molding compound exit region 18. After filling of the injection mold and the injection molding operation of the thermoplastic plastics material, a plug housing 2 is formed as shown in FIG. 1 and FIG. 2.

After unmolding of the plug housing 2, the sprue portion 11 and the riser portion 14 are removed from plug housing 2.

Thereafter, optical waveguides are inserted into receiving portion 7. Receiving portion 7 is closed by a cover, not shown in this view, which is latched in dovetail guides 21 of receiving portion 7. Ends of the optical waveguides received in receiving portion 7 that project beyond contact face 6 are then broken off and contact face 6, along with the broken off ends of the optical waveguides, is polished.

Due to the orientation of the fillers 19 in the region around the V-shaped grooves 8 of receiving portion 7 and in the region between guide bores 9, particularly good thermal properties of the plug housing 2 are obtained. In this regard, the reinforcing fibers 19 extend parallel to a connecting line 22 between guide bores 9.

Figure 3:
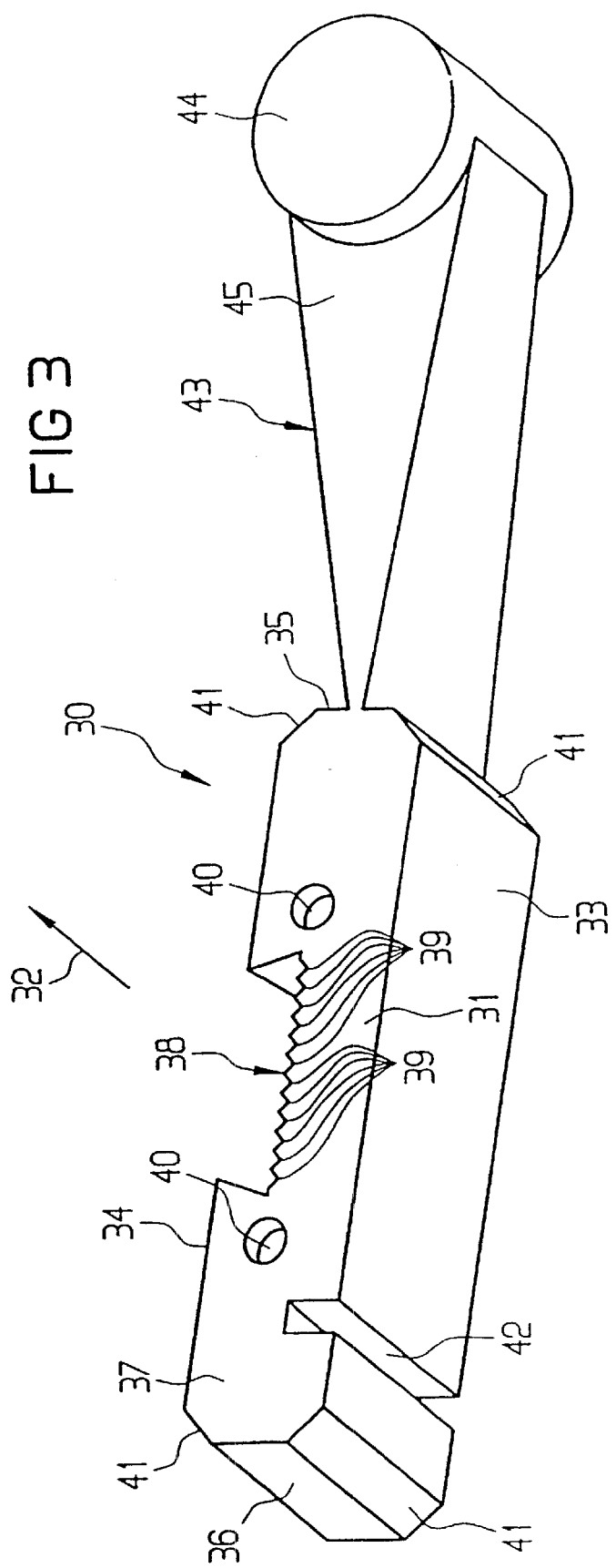
FIG. 3 shows a perspective view of an additional ferrule according to the invention in a manufacturing step after unmolding thereof from an additional mold according to the invention.
Figure 4:
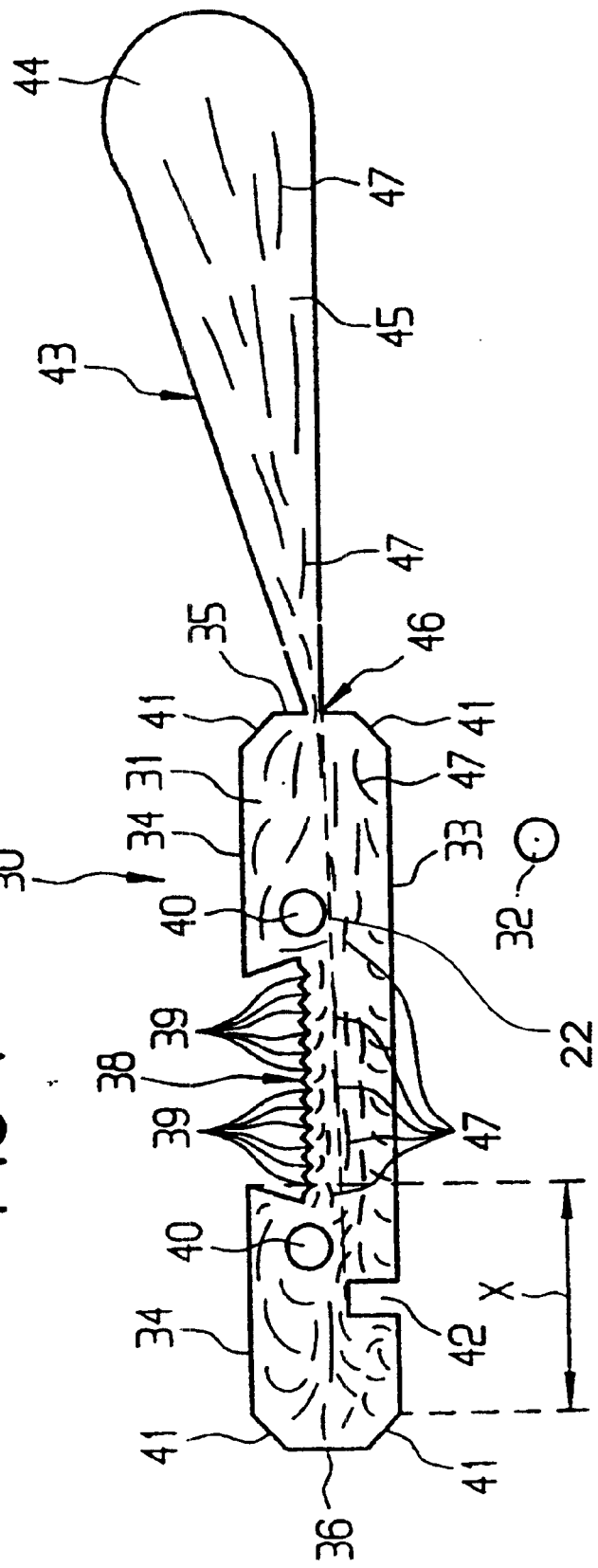
FIG. 4 shows a cross-sectional view of the ferrule of FIG. 3.

FIG. 3 and FIG. 4 show another ferrule 30 of which a plug housing 31 is visible only. FIG. 3 shows a perspective bottom view of plug housing 31, and FIG. 4 shows a cross-sectional view of plug housing 31.

Ferrule 30 is intended to be inserted, in a direction of insertion 32, into a plug having a mating face, which is not shown in this view.

The plug housing 31 is made of a thermoplastic plastics material and, transversely of the direction of insertion 32, has a substantially rectangular cross-section. Plug housing 31 is confined by a lower elongate face 33, an upper elongate face 34, a right-hand side face 35 and a left-hand side face 36, with FIG. 3 showing just a front edge each of upper elongate face 34 and right-hand side face 35.

Towards the front side, plug housing 31 is confined by a contact face 37, and the rear side of plug housing 31 is provided with a terminating face of which just an upper edge and a left-hand side edge are visible in FIG. 3.

The top side of plug housing 31, in the upper elongate face 34, is formed with a receiving portion 38 having twelve V-shaped grooves 39 extending parallel to the direction of insertion 32. The V-shaped grooves 39 are intended to receive optical waveguides of a multiple optical fiber not shown in this view. Receiving portion 38 terminates flush with contact face 37. On the other side of plug housing 31, the receiving portion 38 ends flush with the terminating face.

In addition thereto, plug housing 31, in regions to the left and to the right of receiving portion 38, is formed with one guide bore 40 each which may extend through the entire plug housing 31 parallel to the direction of insertion 32 so as to exit on contact face 37 as well as on the terminating face. Arranged in the guide bores 40 are guide pins, not shown in this view, that project from plug housing 31 beyond contact face 37.

At the outer periphery, in the region of an imaginary connecting edge between the upper elongate face 34, the right-hand side face 35, the left-hand side face 36 and the lower elongate face 33 each, the plug housing 31 according to the invention has guiding and coding chamfers 41.

Furthermore, the lower elongate face 33 has a right parallelepiped shaped flow barrier incision 42 formed therein which extends as an incision from the lower elongate face 33 in the direction towards the upper elongate face 34, almost to the center of plug housing 31 between lower elongate face 33 and upper elongate face 34. Flow barrier incision 42 extends parallel to the direction of insertion 32.

The preferred region in lower elongate face 33, within which flow barrier incision 42 is introduced in plug housing 31, is designated "x" in FIG. 4. It extends from the end of receiving portion 38 directed downstream in the direction of flow at the time of manufacture of plug housing 31 almost up to left-hand face side 36. In specific designs, flow barrier incision 42 may also be provided in a region underneath receiving portion 38.

Plug housing 31, in FIG. 3 and FIG. 4, is shown in a state as resulting immediately after unmolding thereof from an injection mold not illustrated in this view. Accordingly, these views still show a sprue or gating portion 43 on plug housing 31, which is constituted by a sprue channel portion 44 and a fan-type gating portion 45. Provided at plug housing 31 is a molding compound entry region 46 visible best in FIG. 4. In the area of the molding compound entry region 46, the fan-type gating portion 45 has the same width in the direction of insertion as right-hand face 35. In the direction of the height, casting compound entry region 46 takes only part of the right-hand side face 35.

As shown best in FIG. 4, plug housing 31 contains line-shaped fillers and reinforcing fibers 47, the longitudinal direction of extension of which is indicated in FIG. 4 by short lines. The direction of longitudinal extension of the reinforcing fibers 47 often corresponds to the local direction of flow of the plastics compound used for making plug housing 31 shortly before solidification thereof.

As is visible best in FIG. 4, the state present underneath receiving portion 38 is such that the longitudinal orientation of the reinforcing fibers 47 is parallel to a connecting line 22' between casting compound entry region 46 and an upper edge of the flow barrier incision 42.

Due to this orientation of the reinforcing fibers 47 in plug housing 31, particularly good thermal properties of the plug housing 31 are provided. In addition thereto, there are plastics macro-molecules present which, as regards the direction of longitudinal direction thereof, run parallel to reinforcing fibers 47 underneath receiving portion 38.

Manufacture and finishing of a ferrule 30 according to the invention proceed as outlined hereinafter.

In a first manufacturing step, plug housing 31 is made using an injection molding technique. For this purpose, there is provided an injection mold having an entry opening and a channel for the fan-type sprue portion 45 in the area of the molding compound entry region 46. In the region of the flow barrier incision 42, the injection mold has formed therein a rail-shaped projection, with the guide bores 40 being formed by cores inserted into the injection mold. Thereafter, the injection mold is filled with thermoplastic molding compound having fillers and reinforcing fibers 47 admixed thereto. Film gating molding is carried out over the entire length of plug housing 31. Due to the low gating cross-sectional area in the molding compound entry region and due to the central arrangement of the molding compound entry region, the molten plastics compound flows into the mold in a front parallel to side faces 35, 36. Thereafter, shearing of the molten plastics material takes place, and a free jet is formed. Due to this, the molten plastic material flowing into the mold, as well as the reinforcing fibers 47 contained therein, assume an orientation, with respect to each other, parallel to the connecting line 22. For improving the orientation of the reinforcing fibers and the plastics macro-molecules below receiving portion 38, the molten plastics material is moved in the direction of flow of the injection-molding operation until shortly before complete cross-linking thereof. Especially advantageous plug housings 31 result if the position "x" of the flow barrier incision 42 is chosen such that the volume in the injection mold in the direction of flow subsequent to the flow barrier incision 42 is at least equal to the volume of that portion of the plug housing 31 that is located between receiving portion 38 and the lower elongate face 33.

If the plastics compound urged into the injection mold shrinks during complete cross-linking, additional plastics compound is pressed into the injection mold through the fan-type sprue portion 45.

Figure 5:
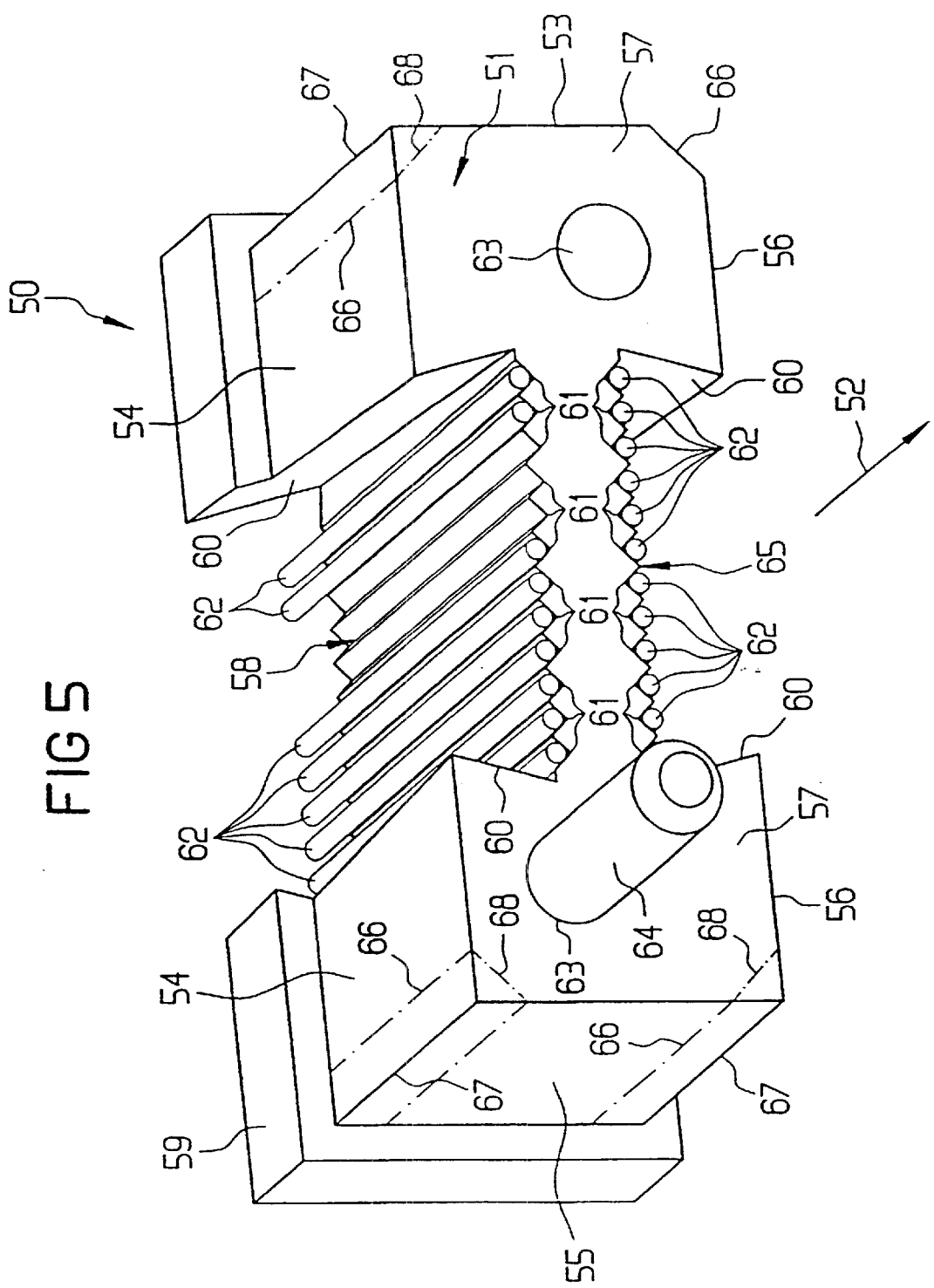
FIG. 5 shows a perspective view of an additional ferrule according to the invention in a state during assembly of a multiple optical waveguide.

FIG. 5 shows another ferrule 50 according to the invention in a perspective view, with this view showing a plug housing 51 only.

The ferrule 50 is inserted, along a direction of insertion 52, into an optical module not shown in this view.

The cross section of the plug housing 57 taken perpendicular to the direction of insertion 52 has a substantially rectangular external shape. The external outline of plug housing 51 is confined by a right-hand side face 53, an upper elongate face 54, a left-hand side face 55 and lower elongate face 56, with FIG. 5 showing just a front edge each of right-hand side face 53 and lower elongate face 56. Towards the front, plug housing 51 is confined by a terminating face 57, whereas the rear end of plug housing 51 is provided with an (not shown) contact face, of which FIG. 5 shows just an upper edge and a side edge.

On the contact side, there is formed an annular stop web 59 which extends around the side faces insert numbers and elongate faces insert numbers of plug housing 51 and also is of right parallelepiped shaped outline.

On the top side of plug housing 51, an upper receiving portion 58 is formed as recess in the upper elongate face 54 and in the upper portion of stop web 59. Upper receiving portion 58 has side walls 60 narrowing in dovetail manner in upward direction towards upper elongate face 54. Furthermore, upper receiving portion 58 has V-shaped grooves 61 formed therein extending parallel to the direction of insertion 52 and intended to receive optical waveguides 62 of a multiple optical fiber provided in ferrule 50. Upper receiving portion 58 terminates flush with terminating face 57.

In addition thereto, plug housing 51 has guide bores 63 provided therein extending parallel to the direction of insertion 52. Guide bore 63 shown on the left-hand side of FIG. 5 has a guide pin 64 inserted therein such that it projects from terminating face 57. Guide bores 63 are offset from each other with respect to a plane of symmetry extending through both the right-hand side face 53 and left-hand side face 55. Guide bore 63 shown on the left-hand side of FIG. 5 is arranged at a higher level than guide bore 63 shown on the right-hand side in FIG. 5.

On the bottom side of plug housing 51 there is provided a lower receiving portion 65 that is formed as recess in the lower elongate face 56 and in the lower portion of stop web 59. With respect to the plane of symmetry of plug housing 51 through the upper elongate face 54 and through the lower elongate face 56, the lower receiving portion 65 and the upper receiving portion 58 are arranged symmetrically with respect to each other. As for the rest, the upper receiving portion 58 and the lower receiving portion 65 are identical with each other, with like parts bearing like reference numerals.

Plug housing 51 has coding elements which are provided by guiding faces 66 in the form of chamfers extending parallel to the direction of insertion 52. On a connecting edge 67 between left-hand side face 55 and upper elongate face 54, between upper elongate face 54 and right-hand side face 53, and between left-hand side face 55 and lower elongate face 56, respectively, there is formed one coding edge 68 each, which in FIG. 5 is delimited from the remainder of plug housing 51 by broken lines.

Due to the specific design of plug housing 51 with guiding faces 66 and coding edge 68, it is ensured that the ferrule 50 can be inserted only into a complementary counter-part having an internal outline corresponding to the external outline of plug housing 51. Different coding effects may be achieved by providing connecting edges between the external peripheral faces of plug housing 51 with coding edges and guiding faces in different combinations.

Coding may also be effected by means of the guide pins 64, namely by the diameter and the arrangement or position of the guide pins 64 in terminating face 57. For example, by an asymmetrical arrangement of guide pins 64 and/or by different diameters thereof, it is possible to prevent insertion of the ferrule into the optical module in a position rotated by 180°.

The manufacture of plug housing 51 of thermoplastic material with reinforcing fibers proceeds in a manner corresponding to the manufacture of plug housing 2 of FIG. 1. The method of the invention is capable of providing a ferrule permitting high information density in transmission.

Figure 6:
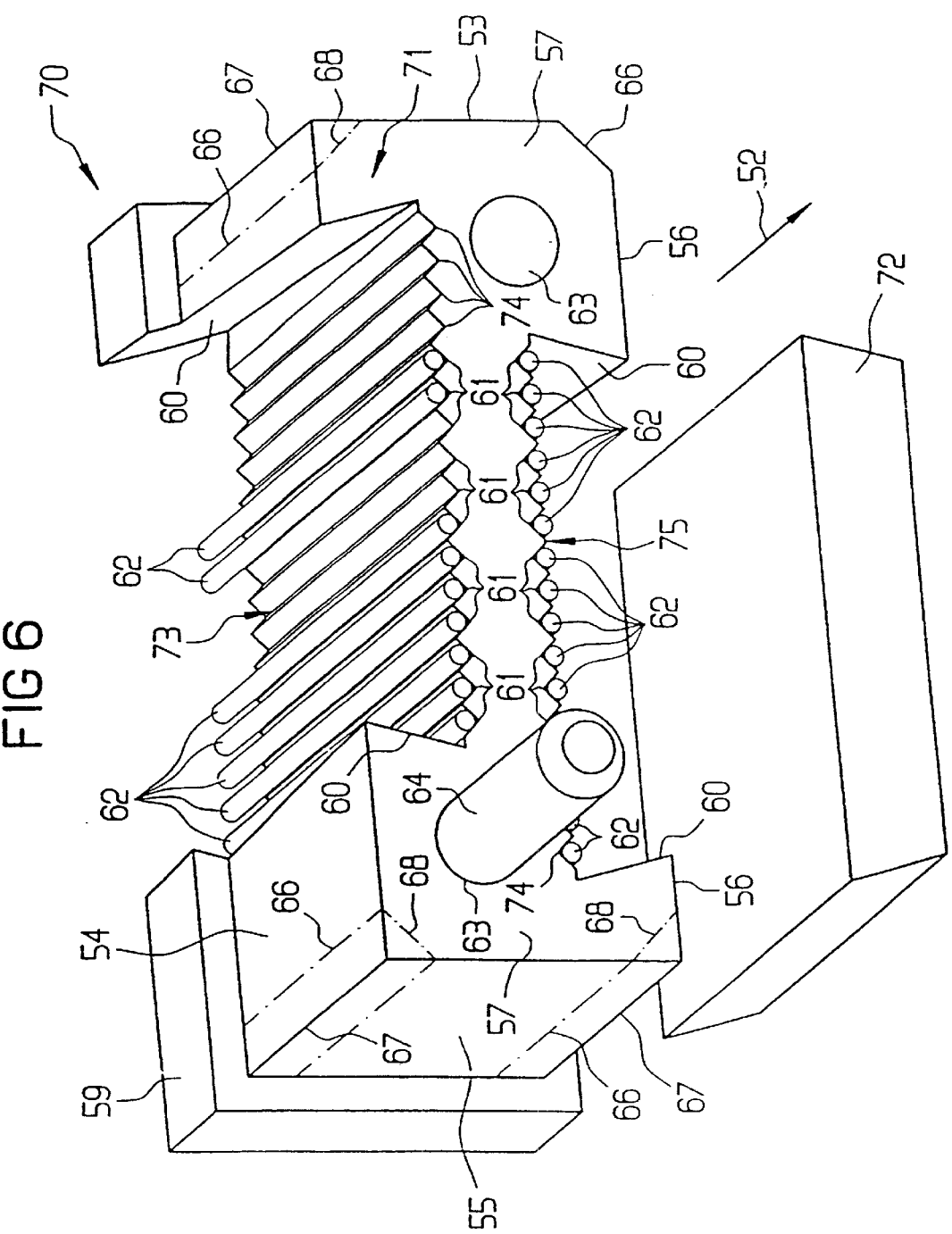
FIG. 6 shows a perspective view of a further ferrule according to the invention in a state during assembly of a multiple optical waveguide.

FIG. 6 illustrates a ferrule 70 in a perspective view, of which only a plug housing 71 is visible in this view which at the bottom side is closed by a dovetail cover 72.

Plug housing 71 in essential parts thereof corresponds to plug housing 51 of FIG. 5. Like parts are thus designated with like reference numerals.

Plug housing 71 differs from plug housing 51 in that it is formed on the top side thereof with an upper receiving portion 73 having additional V-shaped grooves 74 as compared to the upper receiving portion 58 of FIG. 5. In addition thereto, there is provided a lower portion 75 having additional V-shaped grooves 74 as compared to the lower receiving portion 65 of FIG. 5; in this view, there is visible just one additional V-shaped groove 74.

The result of this arrangement is that the upper receiving portion 73 and the lower receiving portion 75 are offset from each other in the direction of insertion 52 through plug housing 71 with respect to a vertical plane of longitudinal symmetry. This provides for a larger number of V-shaped grooves 61, 74, so that the information density that can be transmitted by a ferrule 70 is increased as compared to the conventional ferrules.

The dovetail cover 72 serves for closing the upper receiving portion 73 and the lower receiving portion 75, respectively.

The plug housing 71 is made using a method corresponding to the method of making plug housing 2 of FIG. 1. This method is also referred to as "lost or broken mold" method and is suited in particular for thermoplastic materials having reinforcing fibers.

We claim:

1. A ferrule in particular for use in a pluggable connection for at least two multiple optical fibers to be connected to each other and each including at least two optical waveguides, comprising a plug housing having at least one receiving portion for receiving a multiple optical waveguide, wherein the plug housing is made from thermoplastic material having filler particles admixed thereto, with elongate filler particles being arranged at least in a surrounding region of the receiving portion such that the direction of longitudinal extension of the elongate filler particles runs at least in part transversely to the direction of insertion.

2. The ferrule of claim 1, wherein the plug housing, on at least one side thereof, has a molding compound entry region, and on at least one side of the plug housing opposite said molding compound entry region, there is provided a molding compound exit region.

3. The ferrule of claim 2, wherein the plug housing further comprises a flow barrier incision in the plug housing being provided between at least one side of the plug housing opposite the molding compound entry region and the receiving portion so as to extend substantially over the entire width thereof, with a connecting line between the molding compound entry region and the flow barrier incision, the connecting line running parallel to the direction of extension of elongate filler particles provided in a surrounding region of the receiving portion.

4. The ferrule of claim 1, wherein the plug housing, on at least one side thereof, has a molding compound entry region extending preferably over the entire width thereof, with a flow barrier incision in the plug housing being provided between at least one side of the plug housing opposite the molding compound entry region and the molding compound entry region so as to extend substantially over the entire width thereof, with a connecting line between the receiving portion and the flow barrier incision, the connecting line running parallel to the direction of extension of elongate filler particles provided in a surrounding region of the receiving portion.

5. The ferrule of claim 1, wherein the receiving portion has optical waveguide grooves extending in the direction of insertion.

6. The ferrule claim 1, wherein the receiving portion is designed to be closed by a cover.

7. The ferrule of claim 6, wherein the receiving portion has a dovetail guide means for fixing the cover.

8. The ferrule of claim 1, wherein the thermoplastic material comprises at least a partly crystalline thermoplastic.

9. The ferrule of claim 8, wherein the thermoplastic material comprises liquid crystal polymer, poly(phenylene sulphide) and/or poly(etheretherkeytone).

10. The ferrule of claim 1, wherein there is provided at least one filler designed as reinforcing material.

11. The ferrule of claim 10, wherein the reinforcing material comprises glass, carbon, aramide and/or steel fibers.

12. The ferrule of claim 11, wherein the fibers of the reinforcing material have a diameter ranging from approximately 10 $\mu$m to approximately 20 $\mu$m, and have a length of approximately 300 $\mu$m.

13. The ferrule of claim 1, wherein there are provided fillers in the form of spherical mineral fillers.

* * * * *